United States Patent [19]

Nakamura et al.

[11] 3,828,174

[45] Aug. 6, 1974

[54] NUMERICAL DATA INPUT APPARATUS

[75] Inventors: Tadahiko Nakamura; Yoshinori Tanaka, both of Kanagawa-ken, Japan

[73] Assignee: Sony Corporation, Tokyo, Japan

[22] Filed: Mar. 5, 1973

[21] Appl. No.: 338,390

[30] Foreign Application Priority Data

Mar. 9, 1972 Japan .......................... 47-28854[U]

[52] U.S. Cl. ................. 235/156, 235/159, 235/160, 340/172.5

[51] Int. Cl. ............................................. G06f 5/00

[58] Field of Search .................... 235/156, 159, 160; 340/172.5, 366

[56] References Cited

UNITED STATES PATENTS 3,692,990 9/1972 Kurokawa et al .................. 235/159

*Primary Examiner*—Malcolm A. Morrison
*Assistant Examiner*—R. Stephen Dildine, Jr.
*Attorney, Agent, or Firm*—Lewis H. Eslinger, Esq.; Alvin Sinderbrand, Esq.

[57] ABSTRACT

A numerical data input apparatus stores a numerical data signal supplied thereto in a register with a decimal-point fixed at a predetermined place in the register when the input signal is composed of digits all of which can be stored with the position of the decimal-point fixed in the register, but the input signal is stored in the register with its decimal-point shifted automatically from the predetermined place in the register when the input signal is composed of digits some of which would cause an overflow or underflow if the decimal point was kept at the predetermined place in the register.

4 Claims, 30 Drawing Figures

NUMERICAL DATA INPUT APPARATUS

BACKGROUND OF THE INVENTION

1. Field of the Invention

This invention relates generally to a numerical data input apparatus and more particularly is directed to an improved apparatus of that type in which a numerical data signal supplied thereto is stored in a register with its decimal-point usually fixed at a predetermined place in the register, but with the decimal-point being shifted from the predetermined place in the register when the input signal is composed of digits some of which would cause an overflow or underflow if the decimal point was kept at the predetermined place in the register.

2. Description of the Prior Art

Electronic calculators and the like have a numerical data input apparatus through which digital input signals are supplied for the arithmetic operation, and the arithmetic operation is executed, as is well known, either on the basis of the fixed-point arithmetic method or the floating-point arithmetic method.

When fixed-point arithmetic is performed in conventional electronic calculators or the like, the digital input signal is usually supplied to, and stored in a register of the data input apparatus with its decimal-point also fixed at a predetermined place in the register.

Thus, operators of electronic calculators and the like have to be careful when the input signal is supplied to the register, because the input signal may be composed of digits some of which will cause an overflow or underflow due to the predetermined position of the decimal-point in the register, even though the total number of digits in the input signal is less than the number of places in the register. However, even if the operators are careful, they are still apt to put into the register an input signal composed of digits some of which cause an overflow or underflow without noticing that fact. When an overflow or underflow is caused, the calculators may stop and prevent further operations, or those which cause the overflow or underflow may be dropped or made invalid for the succeeding arithmetic operations. Such dropping of digits may occur without the operators noticing the same, in which case the calculated results may not be satisfactory.

OBJECTS OF THE INVENTION

Accordingly, it is an object of this invention to provide an improved numerical data input apparatus that avoids the above mentioned disadvantages inherent in the prior art.

Another object is to provide an improved numerical data input apparatus suitable for fixed-point arithmetic, and which substantially avoids underflow and overflow.

A further object is to provide an improved numerical data input apparatus, as aforesaid, which is particularly suited for use in electronic calculators.

SUMMARY OF THE INVENTION

A numerical data input apparatus in accordance with this invention comprises an input terminal to receive an input numerical data signal; a register; and a control means which controls the data storing operation of the register, so that a numerical data input signal is supplied to, and stored in the register with its decimal-point fixed at a predetermined place in the register so long as all of the digits of the input signal can be stored with the decimal-point fixed at the predetermined place in the register, but the input signal is stored in the register with the decimal-point shifted automatically from the predetermined place in the register when the input signal is composed of digits some of which would cause an overflow or underflow if the decimal point was kept at the predetermined place in the register.

Further, the calculated result of the arithmetic operation performed with such data input signals is obtained with its decimal-point fixed at the predetermined place in the register.

DESCRIPTION OF THE PREFERRED EMBODIMENT

Figure 1:
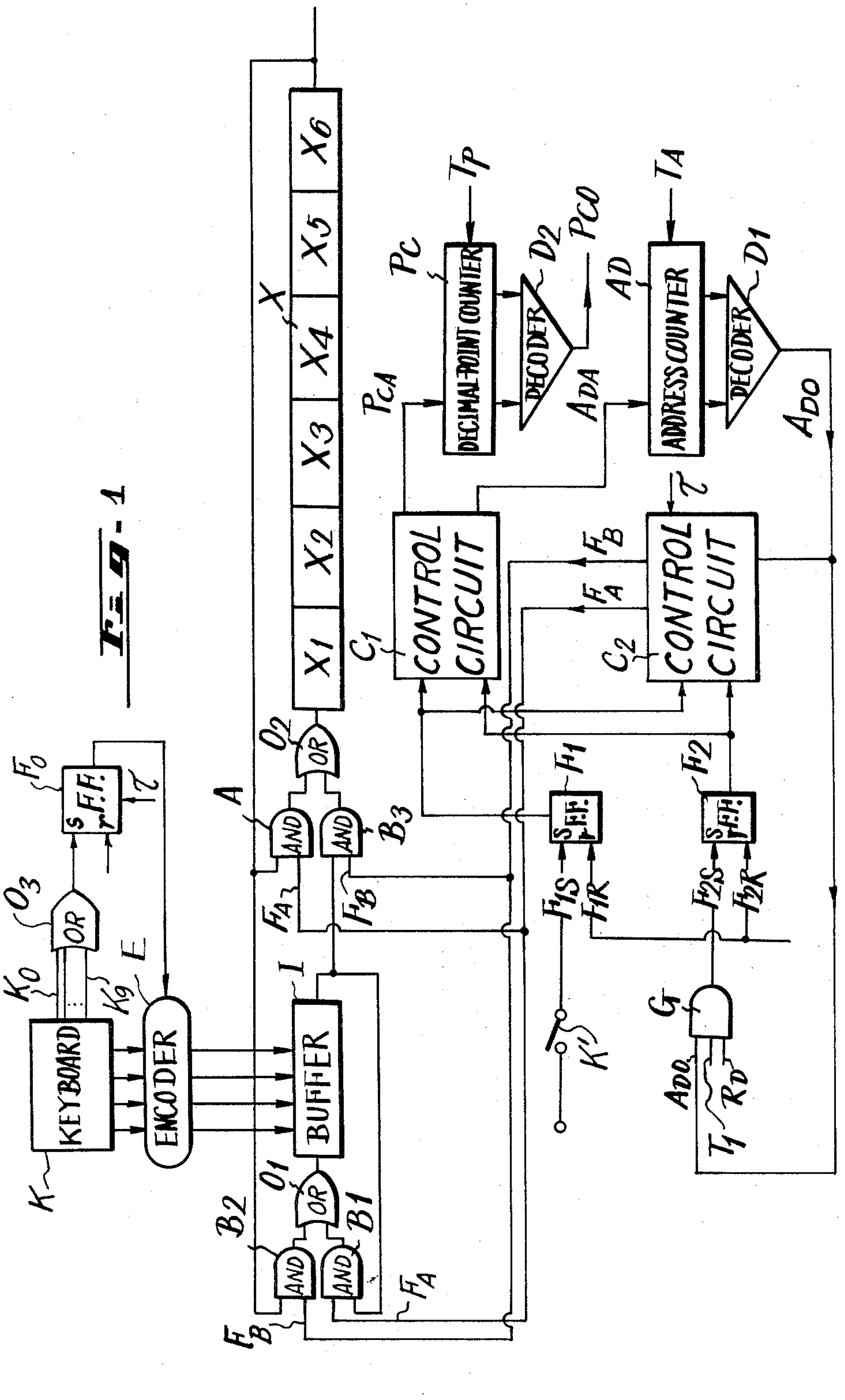
FIG. 1 is a block diagram illustrating a numerical data input apparatus according to an embodiment of the present invention.

Referring to FIG. 1 in detail, a numerical data input apparatus according to the present invention is there shown applied to a desk type electronic calculator. The numerical data input apparatus of FIG. 1 comprises a keyboard K connected to an encoder E which provides a four-bit binary code signal corresponding to the decimal number represented by an actuated key of the keyboard K. The four-bit binary code signal is supplied to a buffer I which is formed as a four-bit or one-digit shift register and included in a circular path that is completed by an AND-gate $B_1$ and an OR-gate $O_1$. The input apparatus further includes a six-digit register consisting of four-bit register elements $X_1$, $X_2$, $X_3$, $X_4$, $X_5$ and $X_6$. A circular path is formed by six-digit register X, an AND-gate A and an OR-gate $O_2$. Another circular path is provided including an AND-gate $B_2$, the OR-gate $O_1$, the buffer I, an AND-gate $B_3$, the OR-gate $O_2$ and the register X. The AND-gates A and $B_1$ are supplied with a signal $F_A$ to be controlled by the latter, and the other AND-gates $B_2$ and $B_3$ are supplied with another signal $F_B$ to be controlled by the latter. The signals $F_A$ and $F_B$ are formed to have opposite values, for example, when one of them is "1" and the other is "0," and they are reversed at the rising edge of an output $A_{DO}$ from an address counter $A_D$ which will be later described. During an appropriate time period, a content applied to and stored in the buffer I is shifted to the register X under the control of the signals $F_A$ and $F_B$, that is, when $F_A$ and $F_B$ are "0" and "1," respectively. In order to indicate a time at which a new numerical input signal is stored in the register X, or appears at a predetermined place in register X, the above mentioned address counter $A_D$ is provided. The addresss counter $A_D$ always counts a digit timing pulse $T_A$ when a control signal $A_{DA}$ applied thereto is "0," that is, when $A_{DA}$ = "0," and the time when the output $A_{DO}$ from a decoder circuit $D_1$ of the address counter $A_D$ becomes "1" indicates the position of the new, or most recently applied numerical signal in register X. At every time when the control signal $A_{DA}$ = "1" is applied to the address counter $A_D$, the latter counts the pulse $T_A$ plus one and, in this case, the time when the output $A_{DO}$ becomes "1" ($A_{DO}$ = "1") is advanced by one digit time.

In order to memorize the position of the decimal point in the register X, there is provided a decimal-point counter $P_C$ which always counts a digit timing pulse $T_P$ applied thereto when a control signal $P_{CA}$ applied thereto is "0," that is, when $P_{CA}$ = "0," and the time when the output $P_{CO}$ from a decoder circuit $D_2$ of the decimal-point counter $P_C$ becomes "1" indicates the position of the decimal point in the register X. The decimal-point counter $P_C$ counts the pulse $T_P$ less one at every time when the control signal $P_{CA}$ = "1" is supplied thereto and, in that case, the time when the output $P_{CO}$ becomes "1" ($P_{CO}$= "1") is delayed by one digit time.

The address counter $A_D$ and the decimal-point counter $P_C$ are constructed so that, upon closing of a power source switch (not shown), the time at which the outputs $A_{DO}$ and $P_{CO}$ becomes "1" in response to the clear operation or the storing of the input signal in the register X is automatically set to correspond with the predetermined or fixed position of the decimal point, so long as control signals $A_{DA}$ and $P_{CA}$ are "0." Further, the control signals $A_{DA}$ and $P_{CA}$ are under the control of flip-flop circuits $F_1$ and $F_2$, as will be described later.

A flip-flop circuit $F_o$ is also provided to apply a signal to encoder E of the electronic calculator upon the actuation of any one of the numeral keys $K_0$ - - - $K_9$ of keyboard K. More particularly, a signal which is "1" during a time period when any one of the numeral keys $K_0$,$K_1$, - - - $K_9$ is operated is applied through an OR-gate $O_3$ to a set terminal $s$ of the flipflop $F_o$ which is also supplied with a word timing pulse $\tau$ after the selected numeral key is operated. The flip-flop circuit $F_o$ then produces an output which is "1" during only one word time period and then returns to "0."

The flip-flop circuit $F_1$ acts to memorize the fact that a decimal-point key K' is actuated, that is, is set by an output $F_{1S}$ applied to its set terminal S from the decimal-point key K', and flip-flop $F_1$ is reset by a signal $F_{1R}$ applied to its reset terminal $r$ and which may be generated when first numerical input signals are set in the register X or when a function key is operated. The flip-flop circuit $F_2$ is set by an output $F_{2S}$ applied to its set terminal $s$ from an AND-gate G which is supplied with the output $A_{DO}$ from the decoder $D_1$ of address counter $A_D$, with a digit timing pulse $T_1$ corresponding to the lowest order of the register X, and with a condition signal $R_D$ which shows that the electronic calculator may be in a condition to be able to receive a key input. Flip-flop $F_2$ is reset by a reset signal $F_{2R}$ applied to its reset terminal $r$ and which is similar to the reset signal $F_{1R}$ applied to the flip-flop circuit $F_1$. Accordingly, the output from the flip-flop $F_2$ is "1" when the output $A_{DO}$ from the decoder $D_1$ of address counter $A_D$ is "1" at the time $T_1$ which corresponds to the lowest order of register X.

A suitable control circuit $C_1$ responds to the output from the flip-flops $F_1$ and $F_2$ to provide the control signals $A_{DA}$ and $P_{CA}$ for address counter $A_D$ and decimal-point counter $P_C$, respectively, and a control circuit $C_2$ responds to the outputs of flip-flops $F_1$ and $F_2$ and address counter $A_D$ to provide the signals $F_a$ and $F_b$ for the AND-gates A and $B_1$ and the AND-gates $B_2$ and $B_3$, respectively. More specifically, if one of the numeral keys $K_0$ . . . $K_9$ is actuated when the flip-flop $F_1$ is in set condition, the control signal $A_{DA}$ becomes "1" and the signals $F_A$ and $F_B$, which are reversed by the output $A_{DO}$ from the decoder $D_1$ of address counter $A_D$, are conditioned or restricted to be continued in their reversed conditions for only one digit period following the output $A_{DO}$. A key representing a digit below the decimal point is actuated when flip-flop $F_2$ is in set condition, the control signal $P_{CA}$ becomes "1." If a key is actuated when flip-flop $F_2$ is set and flip-flop $F_1$ is also set, control signal $P_{CA}$ becomes "1," but the control signal $A_{DA}$ for address counter $A_D$ does not become "1" and the signals $F_A$ and $F_B$, when reversed by the output $A_{DO}$ are conditioned to be continued in their reversed conditions for only one word time period.

The manner in which numerical signals, including digits below the decimal point, are applied to the above apparatus will now be described. First, it will be assumed, with reference to FIG. 2, that the number [123] is being supplied to register X with the position of the decimal point being fixed at the next to the lowest place in the register X, and further that the first two digits [12] have already been supplied to the register.

Figures 2A, 2B, 2C, 2D, 2E, 2F, 2G, 2H, 2I, 2J:
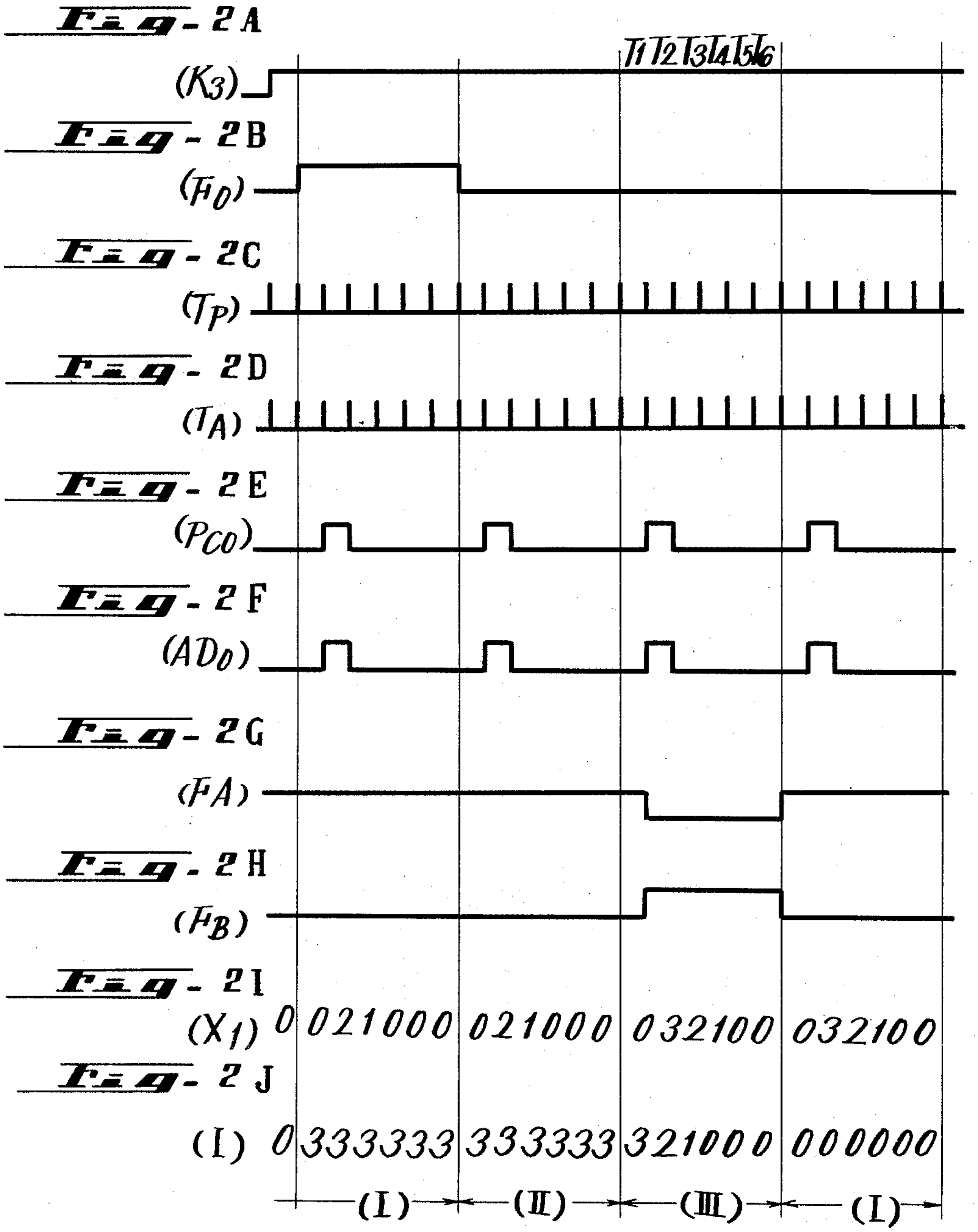
FIGS. 2A–2J, 3A–3J and 4A–4J are waveform diagrams to which reference will be made in explaining the operation of the embodiment shown in FIG. 1.

As shown in FIG. 2A, when the numeral key $K_3$ corresponding to the numeral or digit [3] is actuated, the flip-flop $F_o$ is set during one word time period after actuation of key $K_3$ as shown in FIG. 2B and produces an output of "1." The encoder E is operated by the control signal produced by the flip-flop $F_o$ and hence a binary code signal corresponding to the numeral [3] is set in the buffer I. At this time, since the signal $F_A$ is "1," as shown in FIG. 2G, and the signal $F_B$ is "0," as shown in FIG. 2H, the content [3] set in the buffer I circulates through the path including AND-gate $B_1$, OR-gate $O_1$ and buffer I, and the content memorized in register X also circulates through the path including AND-gate A, OR-gate $O_2$ and register X. FIG. 2I shows the numerals represented by the signals stored on the first digit element $X_1$ of the register X at each digit time, while FIG. 2J shows the numerals represented by the signals stored on the buffer I at each digit time. During this first word time period, the electronic calculator is in the condition [I] of FIGS. 2A–2J. During the next one word time period from the time point when the output of the flip-flop $F_o$ is being reversed, the electronic calculator assumes the conditions indicated at [II] on FIGS. 2A–2J. At the commencement of the one word time period [II] condition signal $R_D$ becomes "1." In the next one word time period represented by condition [III], the digit stored in the buffer I is shifted to the register X. After the condition [III], the electronic calculator is restored to the condition [I] and thus completes the operation of storing the numeral [123] in the register X. Further, the decoded output $P_{CO}$ from the decoder $D_2$ of decimal-point counter $P_C$ which counts the digit timing pulses $T_P$ shown in FIG. 2C becomes "1" at the digit time $T_2$ (FIG. 2E), as the position of the decimal point is fixed at the next to the lowest place. It will also be seen that the decoded output $A_{DO}$ (FIG. 2F) from the decoder $D_1$ of address counter $A_D$ which counts the digit timing pulses $T_A$ (FIG. 2D) also becomes "1" during the digit time $T_2$ and thereby establishes the time when the content [3] in buffer I is supplied to the register X.

With the electronic calculator in the condition [III], the signal $F_A$ is reversed to be "0" at the rising edge of signal $A_{DO}$ while the signal $F_B$ is reversed to be "1" and the signals $F_A$ and $F_B$ are held at those values for the remainder of that one word time period. With the signals $F_A$ and $F_B$ being "0" and "1," respectively, the AND-gate $B_1$ is closed and the AND-gate $B_2$ is opened, the AND-gate $B_3$ is opened and the AND-gate A is closed during the remainder of the one word time period. As a result, when the electronic calculator is in the condition [III], the contents stored in the various elements of register X are varied as shown in the following table.

TABLE 1

| DIGIT TIME | $X_1$ | $X_2$ | $X_3$ | $X_4$ | $X_5$ | $X_6$ |
|---|---|---|---|---|---|---|
| $T_1$ | 0 | 0 | 0 | 0 | 1 | 2 |
| $T_2$ | 3 | 0 | 0 | 0 | 0 | 1 |
| $T_3$ | 2 | 3 | 0 | 0 | 0 | 0 |
| $T_4$ | 1 | 2 | 3 | 0 | 0 | 0 |
| $T_5$ | 0 | 1 | 2 | 3 | 0 | 0 |
| $T_6$ | 0 | 0 | 1 | 2 | 3 | 0 |

At the conclusion of the one word time period represented by the condition III, the signals $F_A$ and $F_B$ are again reversed to be "1" and "0," respectively, and the operation of storing the numeral [123] in register X is completed.

Figures 3A, 3B, 3C, 3D, 3E, 3F, 3G, 3H, 3I, 3J:
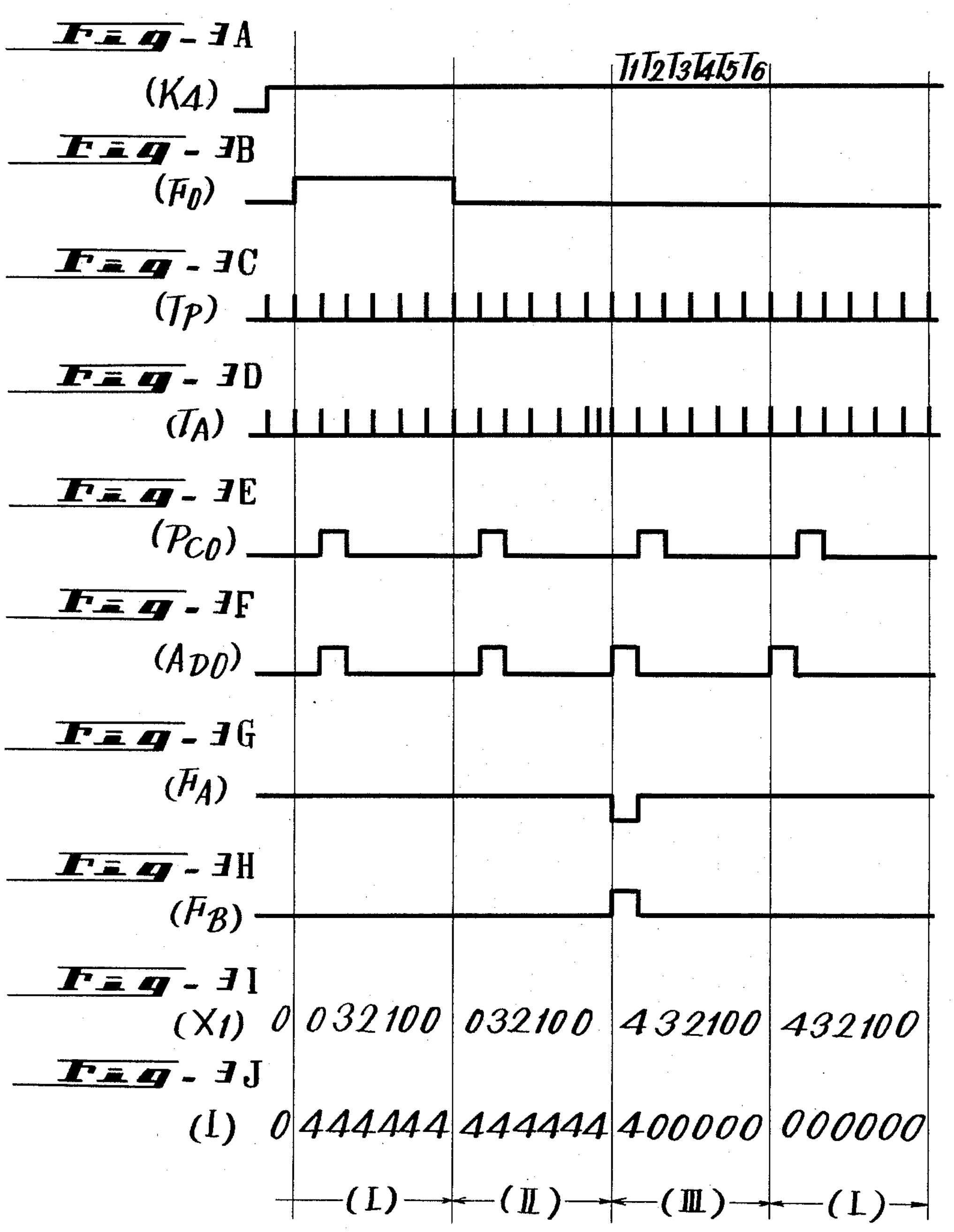

The operation of the apparatus when a digit below the decimal point, for example [4] is applied to the register will now be described with reference to FIG. 3. In this case, the decimal-point K′ is actuated and then the numeral key $K_4$ is actuated (FIG. 3A). During the one word time period [I], a binary code signal corresponding to the numeral key K is set in buffer I, (FIG. 3J). However, due to the fact that flip-flop $F_1$ is set by actuation of decimal-point key K′, during the next one word time period [II] the control signal $A_{DA}$ = "1" is applied to address counter $A_D$. As a result, the address counter $A_D$ counts the digit timing pulse $T_A$ plus one as shown in FIG. 3D. For this reason during the next one word time period [III] the output $A_{DO}$ from decoder $D_1$ of address counter $A_D$ rises up or becomes "1" one digit time earlier than fixed or predetermined position of the decimal point in register X, and hence signal $A_{DO}$ becomes "1" during the period of the digit time $T_1$, as shown in FIG. 3F. The time when the signals $F_A$ and $F_B$ are reversed to become "0" and "1," respectively, is also advanced by one digit time, as shown in FIGS. 3G and 3H. Further, the signals $F_A$ and $F_B$ are reversed again to become "1" and "0" respectively, after one digit time, that is, at the digit time $T_2$, because flip-flop $F_1$ is set. Accordingly, the contents in buffer I are supplied to register X only at the digit time $T_1$. During the one word time period [III ], the contents stored in register X are varied as shown in the following table.

TABLE 2

| DIGIT TIME | $X_1$ | $X_2$ | $X_3$ | $X_4$ | $X_5$ | $X_6$ |
|---|---|---|---|---|---|---|
| $T_1$ | 4 | 0 | 0 | 1 | 2 | 3 |
| $T_2$ | 3 | 4 | 0 | 0 | 1 | 2 |
| $T_3$ | 2 | 3 | 4 | 0 | 0 | 1 |
| $T_4$ | 1 | 2 | 3 | 4 | 0 | 0 |
| $T_5$ | 0 | 1 | 2 | 3 | 4 | 0 |
| $T_6$ | 0 | 0 | 1 | 2 | 3 | 4 |

Thus, the register X has stored therein the number [123.4]. FIGS. 3I and 3J show how the contents stored in the element $X_1$ of register X and in buffer I are varied.

The operation described above is substantially the same as that of a conventional fixed-point arithmetic type numerical data input apparatus. However, in such a conventional apparatus, if a further digit below the decimal-point is desired to be stored in the register, for example, if the number [123.45] is desired to be stored in the register, a so-called underflow will be caused, because the position of the decimal-point is fixed at the second place in the register.

In the apparatus according to this invention, additional digits of lower orders below the decimal point can be stored in register X without causing such underflow. This will be now described with reference to FIG. 4.

Figures 4A, 4B, 4C, 4D, 4E, 4F, 4G, 4H, 4I, 4J:
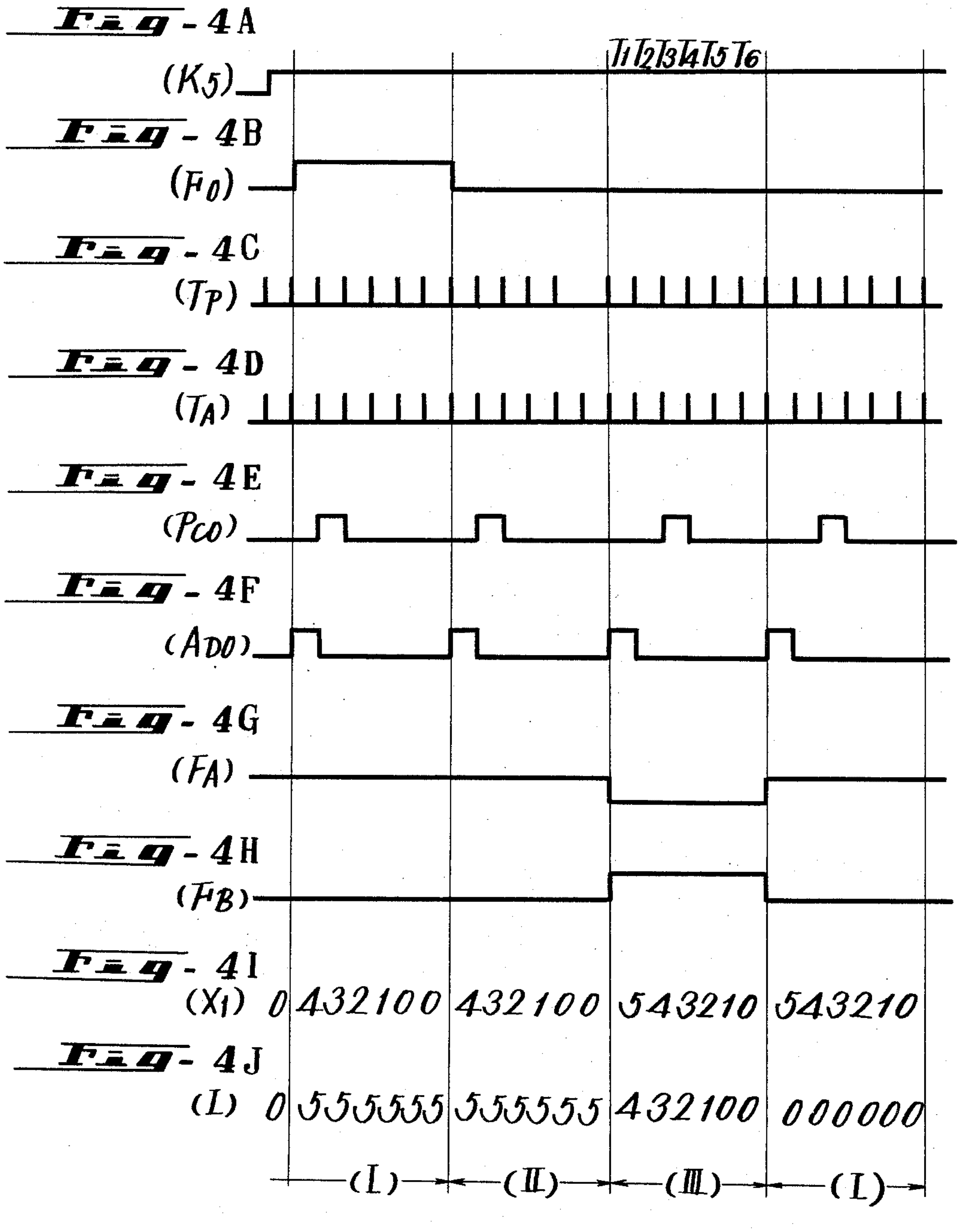

If the numeral key $K_5$ is actuated with the electronic calculator in the condition at the completion of the operation described above with reference to FIG. 3, a binary code signal corresponding to the digit [5] is set in buffer I in a similar manner as mentioned above. At this time, the output $A_{DO}$ from the address counter $A_D$ becomes "1" during the digit time $T_1$ (FIG. 4F) to indicate the position of the most recently applied digit [4] in the register X. When the condition signal $R_D$ becomes "1" during the next one word time period [II], the flip-flop $F_2$ is set. When the flip-flop $F_2$ is set, even though the decimal-point key K′ was actuated prior to actuation of the numeral key $K_5$, the control signal $A_{DA}$ applied to the address counter $A_D$ remains "0," that is, does not become "1." Hence, the address counter $A_D$ still counts the digit timing pulses $T_A$ (FIG. 4D) so that the time when the decoded output $A_{DO}$ from the address counter $A_D$ becomes "1" is not varied. However, when the flip-flop $F_2$ is set, the control signal $P_{CA}$ = "1" is supplied to the decimal-point counter $P_C$, so that the latter counts the digit timing pulse $T_P$ less one during the one word time period [II], and hence the timing when the decoded output $P_{CO}$ becomes "1" is delayed by one digit time during the one word time period [III] as shown in FIG. 4E. The signals $F_A$ and $F_B$ which are reversed at the rising edge of the decoded output $A_{DO}$ from the decoder $D_1$ of address counter $A_D$ in the one word time period [III], are held in their reversed conditions during that one word time period, as shown in FIGS. 4G and 4H, due to the fact that the flip-flop $F_2$ is set.

As will be apparent from the foregoing description, the fact that the flip-flop $F_2$ is set serves to prevent the operation of the set flip-flop $F_1$ in applying the control signal $A_{DA}$ = "1" to the address counter $A_D$ to shift the decoded output $A_{DO}$ by one digit time and in halting the reversed signals $F_A$ and $F_B$ in their reversed condition during only one digit time period, and the setting of flip-flop $F_2$ further causes the control signal $P_{CA}$ = "1" to be applied to the decimal-point counter $P_C$ to shift the decoded output $P_{CO}$ (which shows the position of the decimal point) by one digit or place from the predetermined position in the register X.

During the one word time period [III] the contents stored in the first register element $X_1$ of register X and in buffer I are varied as shown in FIGS. 4I and 4J, and the contents in the register X are varied as shown in the following table:

TABLE 3

| DIGIT TIME | $X_1$ | $X_2$ | $X_3$ | $X_4$ | $X_5$ | $X_6$ |
|---|---|---|---|---|---|---|
| $T_1$ | 5 | 0 | 0 | 1 | 2 | 3 |
| $T_2$ | 4 | 5 | 0 | 0 | 1 | 2 |
| $T_3$ | 3 | 4 | 5 | 0 | 0 | 1 |
| $T_4$ | 2 | 3 | 4 | 5 | 0 | 0 |
| $T_5$ | 1 | 2 | 3 | 4 | 5 | 0 |
| $T_6$ | 0 | 1 | 2 | 3 | 4 | 5 |

Thus, the number [123.45] is stored in the register X.

The apparatus shown in the drawings has six orders so that still another digit below the decimal point can be stored in register X if all the order or register elements are to be used. In such a case, it may be preferable, from the practical standpoint, that the electronic calculator be constructed so that, when the numerical data supplied to the register X will cause a so-called overflow, an underflow will be selectively caused at that time to prevent the occurence of the overflow.

It will be apparent that, in accordance with the present invention, a numerical data input apparatus is normally of a fixed-point arithmetic type, that is, the numerical data input is normally stored in the register with the decimal point at a predetermined position therein. However, if the numerical data input has a number of digits or orders below the decimal point that is greater than the number of orders below the predetermined or fixed position of the decimal point in the register, the position of the decimal point in the register is automatically shifted to prevent underflow, that is, to permit the register to receive and store all of the digits below the decimal point in the numerical data input. Since, in actual practice, the number of digits below the decimal point in numerical data inputs is frequently greater than the number of places or orders below the fixed or predetermined position of the decimal point in the register, the advantages of the present invention in avoiding underflow will be apparent.

The signals $F_A$ and $F_B$ used for controlling the gate circuits connected to register X and buffer I in the illustrated embodiment of the invention may be provided by means other than those described above with the same effects.

In the embodiment described above, the decimal point is described as being floated or shifted from the predetermined position in the register when an underflow would otherwise be caused, but it will be understood that the present invention is similarly applicable to the case where an overflow would be caused.

Although an illustrative embodiment of the invention has been described above with reference to the accompanying drawings, it is to be understood that the invention is not limited to that precise embodiment, and that various changes and modifications may be effected therein by one skilled in the art without departing from the scope or spirit of the invention.

What is claimed is:

1. Numerical data input apparatus comprising:
an input terminal to receive a numerical data input signal;
a register supplied with said numerical data input signal from said input terminal; and control means connected to said register including:
means including a decimal point counter for setting a decimal point at a predetermined position in said register,
an address counter, and
comparing means for comparing the position of a decimal point of the numerical data input signal with said predetermined position of the decimal point in said register,
said decimal point counter being responsive to the output of said comparing means and coacting with said address counter for shifting the decimal point in said register from said predetermined position when said register is unable to accommodate the whoe numerical data input signal with the decimal set at said predetermined position therein.

2. Numerical data input apparatus comprising:
an input terminal to receive a numerical data input signal;
a register supplied with said numerical data input signal from said input terminal; and
control means connected to said register including:
a decimal point counter for setting a decimal point at a predetermined position in said register,
an address counter,
means responsive to said decimal point counter and said address counter for controlling said register so that the latter stores therein said input signal with said predetermined position of the decimal point when the number of digits below a decimal point in said input signal is not greater that the number of places below said predetermined decimal point in said register,
shifting means responsive to said decimal point counter and said address counter for shifting the contents of said register together with the decimal point included therein when the number of the digits below the decimal point in said input signal is greater than the number of the places below said predetermined position of the decimal point in said register, and
means responsive to said shifting means for controlling said register so that said register further stores digits of the input signal beyond said number of said places below said predetermined position of the decimal point in the register.

3. Numerical data input apparatus comprising:
an input terminal to receive a numerical data input signal;
a register supplied with said numerical data input signal from said input terminal; and
control means connected to said register including:
means including a decimal point counter for setting a decimal point at a predetermined position in said register;
an address counter,
means responsive to said decimal point counter and said address counter for controlling said register so that the latter stores said input signal with said predetermined position of the decimal point when the number of digits above a decimal point in said input signal is not greater than the number of places above said predetermined position of the decimal point in said register,
shifting means responsive to said decimal point counter and said address counter for shifting the contents of said register together with the decimal point included therein when the number of the digits above the decimal point in said input signal is greater than the number of places above said predetermined position of the decimal point in said register, and means responsive to said shifting means for controlling said register so that said register further stores digits of the input signal beyond said number of said places above said predetermined position of the decimal point in the register.

4. Numerical data input apparatus comprising:

signal input means including a keyboard for supplying a numerical data input signal in response to the operation of the keyboard;

a register;

a buffer connected between said signal input means and said register for selectively supplying said numerical data input signal from said signal input means to said register under the control of an address counter;

control means connected to said register comprising means for setting a decimal point at a predetermined position in said register;

comparing means for comparing the position of a decimal point of the numerical data input signal with said predetermined position of the decimal point in said register; and means responsive to the output of said comparing means for shifting the decimal point in said register from said predetermined position when said register is unable to accommodate the whole numerical data input signal with the decimal point set at said predetermined position therein.

* * * * *